United States Patent
Heibel

(10) Patent No.: US 10,446,283 B2
(45) Date of Patent: Oct. 15, 2019

(54) SYSTEM AND PROCESS FOR PRODUCTION AND COLLECTION OF RADIOISOTOPES

(71) Applicant: Westinghouse Electric Company LLC, Cranberry Township, PA (US)

(72) Inventor: Michael D. Heibel, Harrison City, PA (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 404 days.

(21) Appl. No.: 15/341,478

(22) Filed: Nov. 2, 2016

(65) Prior Publication Data

US 2018/0122521 A1    May 3, 2018

(51) Int. Cl.
- G21C 19/20    (2006.01)
- G21C 17/108   (2006.01)
- G21G 1/02     (2006.01)
- G21C 23/00    (2006.01)

(52) U.S. Cl.
CPC .......... *G21C 17/108* (2013.01); *G21C 23/00* (2013.01); *G21G 1/02* (2013.01)

(58) Field of Classification Search
CPC ...... G21C 19/20; G21C 17/108; G21C 19/07; G21C 23/00; G21G 1/02
USPC .................................. 376/202, 254
See application file for complete search history.

(56) References Cited

U.S. PATENT DOCUMENTS

| | | | |
|---|---|---|---|
| 3,932,211 A | 1/1976 | Loving, Jr. | |
| 4,196,047 A * | 4/1980 | Mitchem | G21C 1/303 376/202 |
| 4,839,135 A * | 6/1989 | Merkovsky | G21C 17/108 376/254 |
| 5,254,308 A * | 10/1993 | Garde | G21C 3/06 148/672 |
| 6,356,614 B1 * | 3/2002 | Allen | G21C 3/3305 376/434 |
| 2007/0133731 A1 | 6/2007 | Fawcett et al. | |

(Continued)

FOREIGN PATENT DOCUMENTS

EP    2242062 A2    10/2010

OTHER PUBLICATIONS

Heibel, M. D., et al., U.S. Appl. No. 15/210,231, Irradiation Target Handling Device, filed Jul. 14, 2016, 10 pages.

(Continued)

*Primary Examiner* — Jack W Keith
*Assistant Examiner* — Daniel Wasil
(74) *Attorney, Agent, or Firm* — Joseph C. Spadacene; Westinghouse Electric Company LLC

(57) ABSTRACT

A means for installing material, through a fuel assembly instrument thimble insert, into the existing instrument thimbles in nuclear fuel assemblies for the purpose of allowing the material to be converted to commercially valuable quantities of desired radioisotopes during reactor power operations during a remainder of a fuel cycle and removing the radioisotopes from the core through the reactor flange opening once the fuel assemblies have been removed for refueling. The invention also describes methods that can be used to harvest the irradiated material so it can be packaged for transportation from the reactor to a location where the desired radioisotope(s) can be extracted from the fuel assembly instrument thimble insert.

7 Claims, 3 Drawing Sheets

(56) References Cited

U.S. PATENT DOCUMENTS

| | | | |
|---|---|---|---|
| 2009/0213977 A1* | 8/2009 | Russell | G21G 1/02 |
| | | | 376/202 |
| 2011/0051872 A1 | 3/2011 | Rickard et al. | |
| 2012/0195402 A1 | 8/2012 | Chahande et al. | |
| 2013/0077725 A1* | 3/2013 | Bloomquist | G21G 1/02 |
| | | | 376/202 |
| 2016/0012928 A1* | 1/2016 | Guler | G21C 23/00 |
| | | | 376/156 |

OTHER PUBLICATIONS

International Search Report and Written Opinion of the International Searching Authority for PCT/US2017/058414 dated Jul. 18, 2018 (Forms PCT/ISA/220, PCT/ISA/210 and PCT/ISA/237).

* cited by examiner

SYSTEM AND PROCESS FOR PRODUCTION AND COLLECTION OF RADIOISOTOPES

BACKGROUND

1. Field

This invention pertains generally to methods and devices for the insertion and removal of radioactive isotopes into and out of a nuclear core and, more particularly, to the insertion and removal of such isotopes that can remain in the nuclear core for at least the remainder of a full operating cycle after insertion.

2. Related Art

A number of operating reactors employ a moveable in-core detector system such as the one described in U.S. Pat. No. 3,932,211, to periodically measure the axial and radial power distribution within the core. The moveable detector system generally comprises four, five or six detector/drive assemblies, depending upon the size of the plant (two, three or four loops), which are interconnected in such a fashion that they can assess various combinations of in-core flux thimbles. To obtain the thimble interconnection capability, each detector has associated with it a five-path and ten-path rotary mechanical transfer device. A core map is made by selecting, by way of the transfer devices, particular thimbles through which the detectors are driven. To minimize mapping time, each detector is capable of being run at high speed (72 feet per minute) from its withdrawn position to a point just below the core. At this point, the detector speed is reduced to 12 feet per minute and the detector traversed to the top of the core, direction reversed, and the detector traversed to the bottom of the core. The detector speed is then increased to 72 feet per minute and the detector is moved to its withdrawn position. A new flux thimble is selected for mapping by rotating the transfer devices and the above procedure repeated.

FIG. 1 shows the basic system for the insertion of the movable miniature detectors. Retractable thimbles 10, into which the miniature detectors 12 are driven, take the routes approximately as shown. The thimbles are inserted into the reactor core 14 through conduits extending from the bottom of the reactor vessel 16 through the concrete shield area 18 and then up to a thimble seal table 20. Since the movable detector thimbles are closed at the leading (reactor) end, they are dry inside. The thimbles, thus, serve as a pressure barrier between the reactor water pressure (2500 psig design) and the atmosphere. Mechanical seals between the retractable thimbles and the conduits are provided at the seal table 20. The conduits 22 are essentially extensions of the reactor vessel 16, with the thimbles allowing the insertion of the in-core instrumentation movable miniature detectors. During operation, the thimbles 10 are stationary and will be retracted only under depressurized conditions during refueling or maintenance operations. Withdrawal of a thimble to the bottom of the reactor vessel is also possible if work is required on the vessel internals.

The drive system for insertion of the miniature detectors includes, basically, drive units 24, limit switch assemblies 26, five-path rotary transfer devices 28, 10-path rotary transfer devices 30, and isolation valves 32, as shown. Each drive unit pushes a hollow helical wrap drive cable into the core with a miniature detector attached to the leading end of the cable and a small diameter coaxial cable, which communicates the detector output, threaded through the hollow center back to the trailing end of the drive cable.

The use of the Moveable In-core Detector System flux thimbles 10 for the production of irradiation desired neutron activation and transmutation products, such as isotopes used in medical procedures, requires a means to insert and withdraw the material to be irradiated from inside the flux thimbles located in the reactor core 14. Preferably, the means used minimizes the potential for radiation exposure to personnel during the production process and also minimizes the amount of radioactive waste generated during this process. In order to precisely monitor the neutron exposure received by the target material to ensure the amount of activation or transmutation product being produced is adequate, it is necessary for the device to allow an indication of neutron flux in the vicinity of the target material to be continuously measured. Ideally, the means used would be compatible with systems currently used to insert and withdraw sensors within the core of commercial nuclear reactors. Co-pending U.S. patent application Ser. No. 15/210,231, entitled Irradiation Target Handling Device, filed Jul. 14, 2016, describes an Isotope Production Cable Assembly that satisfies all the important considerations described above for the production of medical isotopes that need core exposure for less than a full fuel cycle.

There are other commercially valuable radioisotopes that are produced via neutron transmutation that require multiple neutron induced transmutation reactions to occur in order to produce the desired radioisotope product, or are derived from materials having a very low neutron interaction cross section, such as Co-60, W-188, Ni-63, Bi-213 and Ac-225. These isotopes require a core residence time of a fuel cycle or more. Commercial power reactors have an abundance of neutrons that do not significantly contribute to the heat output from the reactor used to generate electrical power. This invention describes a process and associated hardware that may be used to utilize the neutron environment in a commercial nuclear reactor to produce commercially valuable quantities of radioisotopes that require long-term neutron exposure with minimal impact on reactor operations and operating costs.

SUMMARY

This invention provides a nuclear fuel assembly target flux thimble insert for irradiating a target material over an extended portion of a fuel cycle and harvesting the irradiated target material at the end of the fuel cycle. The flux thimble insert includes an elongated tubular housing having an axis along its elongated dimension. The elongated tubular housing is closed at a forward end and capped at a rearward end to form a target specimen chamber there between within an interior of the elongated tubular housing. The elongated tubular housing is sized to slide within an instrument thimble of a nuclear fuel assembly resident within a reactor core, with the rearward or trailing end structured to be driven by a drive cable of an existing moveable in-core detector system. An elongated target specimen is captured within an interior of the elongated tubular housing between a forward and a rear axial position plug, with the axial position plugs structured to seat against an interior wall of the elongated tubular housing to hold the target specimen at a preselected axial position within the interior of the elongated tubular housing.

In one embodiment, the target specimen is formed from one or more of Co-60, W-188, Ni-63, Bi-213 and Ac-225. Preferably, the elongated tubular housing is constructed from a material having a low neutron capture cross-section such as, for example, zirconium or a zirconium alloy.

In another embodiment, the axial position plugs maintain their axial position due to friction between interfacing surfaces on the axial position plugs and the interior wall of the elongated tubular housing. Alternately, the axial position plugs may maintain their axial position by fitting into slight recesses in the interior wall of the elongated tubular housing or a combination of both designs may be employed. Preferably, in the embodiment that employs recesses for the axial position plugs, the upper and lower surfaces of the axial position plugs that extend substantially orthogonal to the axis have an outer substantially circular wall extending there between with the dimension of the outer, substantially circular wall sized to fit into one of the recesses. Preferably, in the latter embodiment the interface of the upper and lower surfaces with the outer, substantially circular wall are slanted at an acute angle to facilitate lodging and dislodging of the axial position plugs from the recesses.

The invention also contemplates a method of irradiating an isotope that requires an extended exposure within a nuclear reactor lasting at least one fuel cycle, to achieve an intended target product. The method comprises the step of enclosing the isotope within an elongated tubular housing having an axis along its elongated dimension. The elongated tubular housing is closed at a forward end and capped at a rearward end to form a target specimen chamber therebetween within an interior of the elongated tubular housing. The elongated tubular housing is sized to slide within an instrument thimble of a nuclear fuel assembly, with the rearward end structured to be driven by a drive cable of an existing moveable in-core detector system. The isotope is then positioned at a preselected axial position within the elongated tubular housing and the rearward end of the housing is attached to the drive cable. The isotope within the elongated tubular housing is then driven at least partially through an instrument thimble of a selected nuclear fuel assembly within a core of a nuclear reactor and left within the core for the remainder of the fuel cycle. The elongated tubular housing is removed from the core at the end of the fuel cycle and the selected fuel assembly removed from the core. The elongated tubular housing is then reinserted into the core location and a portion of the elongated tubular housing containing the isotope is then removed from the drive cable. In one embodiment, the removed portion of the elongated tubular housing is transferred under water to a spent fuel pool where it may be packaged for shipment.

BRIEF DESCRIPTION OF THE DRAWINGS

A further understanding of the invention can be gained from the following description of the preferred embodiments when read in conjunction with the accompanying drawings in which.

DESCRIPTION OF THE PREFERRED EMBODIMENT

Figure 1:
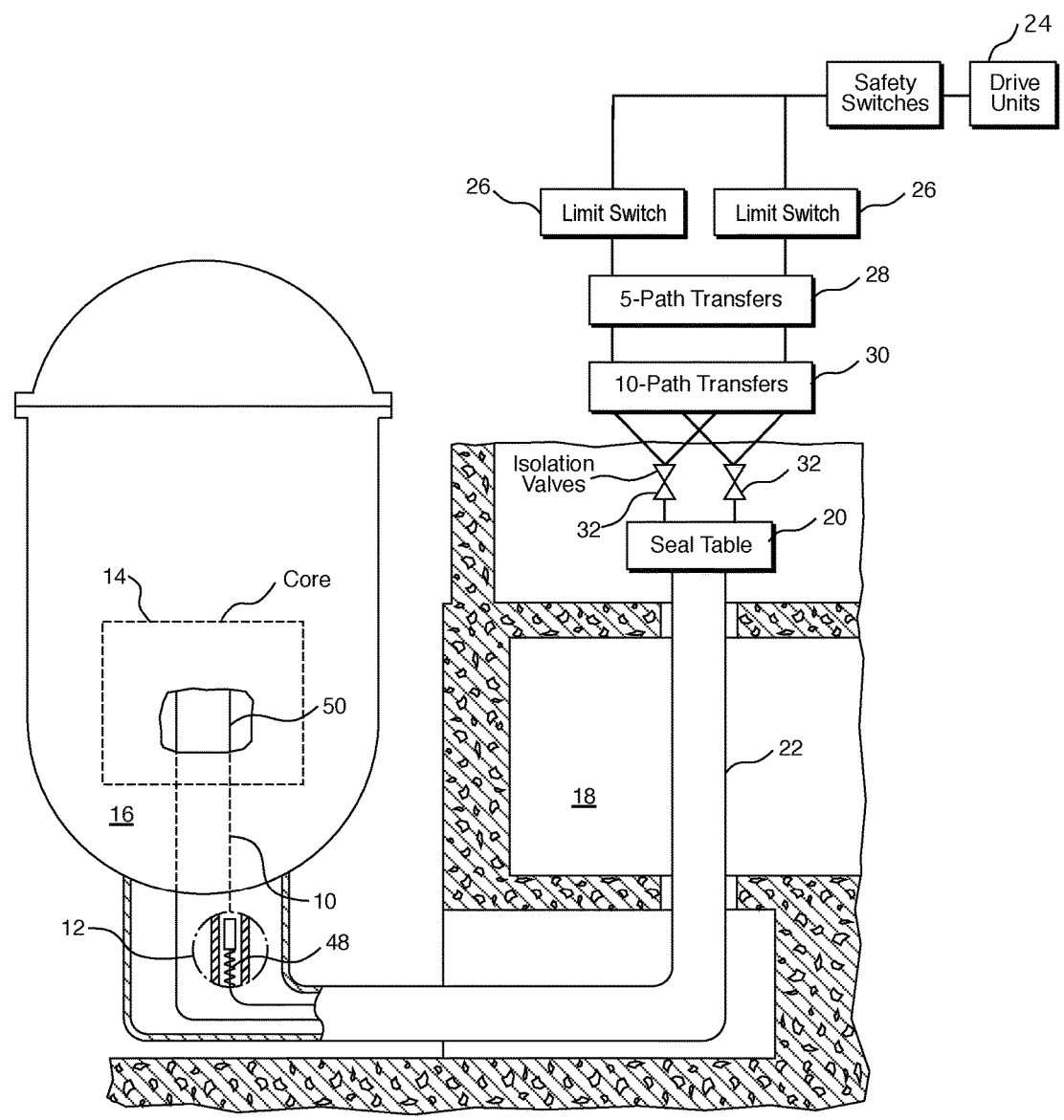
FIG. 1 is a perspective view of a prior art in-core moveable detector arrangement that can be employed with this invention.
Figure 2:
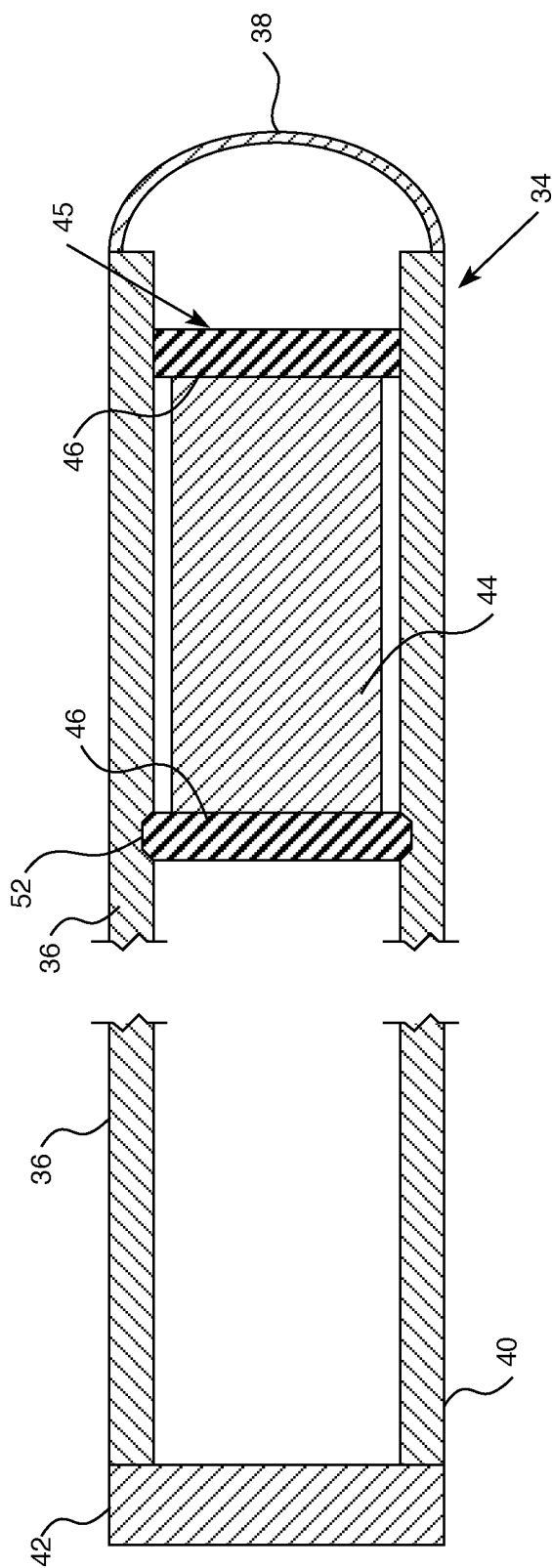
FIG. 2 is a schematic cross-sectional view of one embodiment of a target flux thimble of this invention.

One preferred embodiment of the radioisotope production process of this invention utilizes the flux thimbles that provide the access conduit for the existing movable in-core detector fission chambers to the instrument thimble in the fuel assembly to periodically measure the reactor power distribution, to insert the target material to be transmuted into a desired radioisotope, into the fuel assembly instrument thimble. The flux thimble containing the target material, hereafter referred to as the target flux thimble 34, is shown schematically in FIG. 2 and takes the place of the miniature detector 12 shown in FIG. 1 as being inserted into the fuel assembly instrument thimble 50. The target flux thimble 34 is attached to the drive cable 48 in place of the miniature detector 12 and comprises an outer sheath 36 having an enclosed lead end 38 that is preferably rounded or beveled and an enclosed trailing end 40 that is enclosed by a cap 42 once the specimen or isotope target capsule 44 has been loaded within the chamber 45 within the outer sheath 36. The target material capsule 44 may have its own sheath (not shown) or if in solid self-standing form may be capped at either axial end by axial position end plugs 46 that position the target material capsule 44 in a desired axial position within the target flux thimble 34. The axial position end plugs may be held in position by friction or fit in slight recesses 52 in the inside surface of the target flux thimble sheath 36 preferably with the interfacing surface of the axial position end plugs beveled to assist movement of the axial position end plugs into the recesses when they are loaded into the target flux thimble sheath 36. The target flux thimble 34 remains in place within the fuel assembly instrument thimble 50 throughout the remainder of the reactor operating cycle after it is installed within the fuel assembly instrument thimble. When the reactor is refueled all the flux thimbles are withdrawn below the lower core plate inside the reactor vessel to allow the fuel assembly to be shuffled and/or removed from the vessel as part of the refueling process. If the amount of the desired radioisotope is expected to be sufficient inside a target flux thimble, the target flux thimble can be re-inserted into the empty reactor vessel location previously occupied by the removed fuel assembly to allow the portion of the target flux thimble containing the irradiated target material that was inside the fuel assembly instrument thimble to be cut off from the target flux thimble using existing tooling dedicated to flux thimble removal operations.

Figure 3:
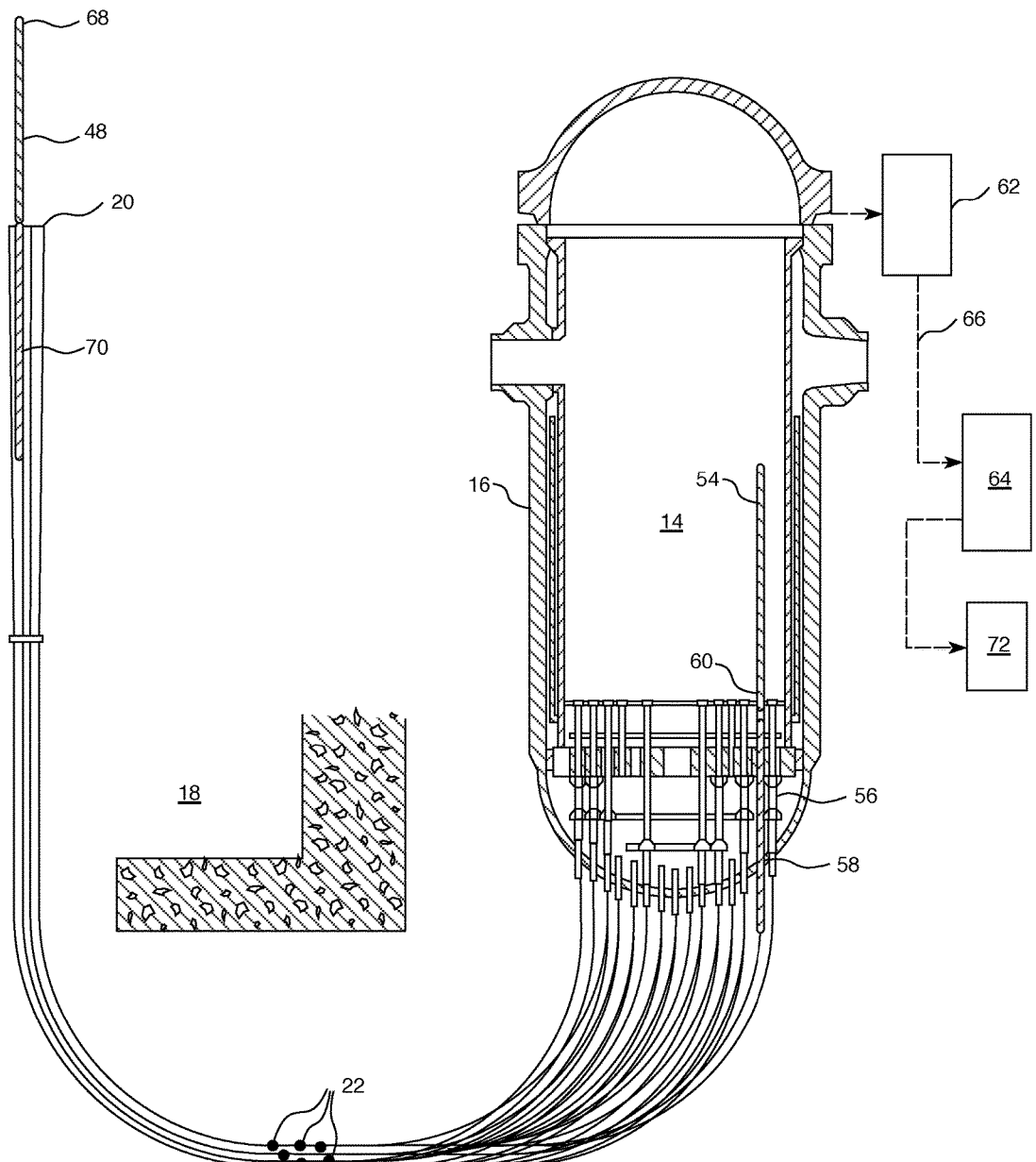
FIG. 3 is a schematic view of a reactor vessel and moveable in-core detector drive system showing the target flux thimble insertion and withdrawal positions of this invention.

FIG. 3 provides an illustration of the positioning of the target flux thimble during the irradiation, refueling, and harvesting phases of production. Like reference characters are used among the several figures to represent corresponding components. Reference character 22 points to the guide conduits through which the target flux thimble 34 travels from the seal table 20. The guide conduits 22 are each aligned with a corresponding instrument column 56, which is aligned with a corresponding instrument thimble in one of the fuel assemblies in the core. Reference character 54 points to the fully inserted target flux thimble position in the corresponding fuel assembly in the core at which the target material capsule will be irradiated and reference character 58 refers to the fully withdrawn position that enables the corresponding fuel assembly to be withdrawn from the core, prior to harvesting the target material. Reference characters 68 and 70, respectively, show the difference of the fully withdrawn position and the fully inserted position at the seal table 20. After the fuel assembly is withdrawn from the core the target flux thimble 34 can be reinserted into the core area and severed at reference character 60 for removal from the reactor vessel. The irradiated target material can then be inserted into a container 62 that will allow the target material containing target flux thimble portion to be transferred via the fuel transfer system 66 to the spent fuel pool 64 where it can be packaged in a shielded shipping container 72 to ship to a processing facility. The remaining portion of the affected target flux thimble is removed using standard maintenance procedures and is replaced with a new target flux thimble. The process can be repeated as many times as desired, and simultaneously in as many different core locations as prudent to ensure that at least 75% of the fuel assembly locations hosting flux thimbles are available throughout the operating cycle.

The typical prior art method for producing commercially valuable radioisotopes that require long term irradiation inside commercial nuclear reactors involves inserting one or more fuel pin structures that contain the target material into one or more fuel assemblies. The process offered by this invention avoids the need to perform the very rigorous, time consuming and expensive analysis needed to support modifications to a licensed fuel assembly design to incorporate the modified fuel pin structures. The fuel assembly instrument thimbles that are accessed via the flux thimbles by the moveable in-core detector fission chambers do not require any modifications. Since there are no modifications to the fuel assembly design required by the approach documented herein, there is little cost associated with implementation of this process.

The irradiation of target materials to produce a desired radioisotope is the first step in the production of any commercially valuable radioisotope. Consequently, the potential business is the entire breadth of the longer lived radioisotope production market. Some notable highly desired (and priced) radioisotopes suitable for the production process addressed by this invention include Co-60, W-188, Ni-63, Bi-213, and Ac-225. The process described herein lends itself to the use of radioactive target material since the ability to shield the target material before it is irradiated is supported by the existing features of the moveable in-core detector architecture.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention which is to be given the full breadth of the appended claims and any and all equivalents thereof.

What is claimed is:

1. A nuclear fuel assembly flux thimble insert comprising:
   an elongated tubular housing having an axis along its elongated dimension,
     the elongated tubular housing being
       closed at a forward end and
       capped at a rearward end
         to form a target specimen chamber there between within an interior of the elongated tubular housing,
     the elongated tubular housing being sized to slide within an instrument thimble of a nuclear fuel assembly,
       with the rearward end structured to be driven by a drive cable of an existing moveable in-core detector system; and
   an elongated target specimen captured between a forward axial position plug and a rear axial position plug,
     wherein the axial position plugs extend across the interior of the elongated tubular housing,
     wherein the axial position plugs are structured to seat against an interior wall of the elongated tubular housing
       to hold the target specimen at a preselected axial position within the interior of the elongated tubular housing,
     wherein the target specimen is nuclear reactor transmutable to produce at least one commercial radioisotope.

2. The nuclear fuel assembly flux thimble insert of claim 1, wherein the at least one commercial radioisotope comprises one or more of Co-60, W-188, Ni-63, Bi-213, and Ac-225.

3. The nuclear fuel assembly flux thimble insert of claim 1, wherein the elongated tubular housing is constructed from zirconium or a zirconium alloy.

4. The nuclear fuel assembly flux thimble insert of claim 1, wherein the axial position plugs maintain their axial position due to friction between interfacing surfaces on the axial position plugs and the interior wall of the elongated tubular housing.

5. The nuclear fuel assembly flux thimble insert of claim 1, wherein the axial position plugs maintain their axial position by fitting in slight recesses in the interior wall of the elongated tubular housing.

6. The nuclear fuel assembly flux thimble insert of claim 5, wherein the axial position plugs have an upper and lower surface that extends substantially orthogonal to the axis with an outer, substantially circular wall extending between the upper and lower surface, wherein the axial dimension of the outer, substantially circular wall is sized to fit in one of the recesses.

7. The nuclear fuel assembly flux thimble insert of claim 6, wherein the interface of the upper and lower surfaces with the outer, substantially circular wall are slanted at an acute angle to facilitate lodging and dislodging of the axial position plugs from the recesses.

* * * * *